United States Patent
Okubo et al.

(10) Patent No.: US 10,407,069 B2
(45) Date of Patent: Sep. 10, 2019

(54) METHODS AND SYSTEM FOR CONTROLLING ENGINE BRAKING

(71) Applicant: Ford Global Technologies, LLC, Dearborn, MI (US)

(72) Inventors: Carol Louise Okubo, Dearborn, MI (US); Kent Hancock, Ann Arbor, MI (US); Jacob Doan, Royal Oak, MI (US); Bryan Whitney D. Belt, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 15/493,704

(22) Filed: Apr. 21, 2017

(65) Prior Publication Data

US 2018/0304895 A1 Oct. 25, 2018

(51) Int. Cl.
| | |
|---|---|
| *B60K 6/543* | (2007.10) |
| *B60W 30/18* | (2012.01) |
| *F16H 61/21* | (2006.01) |
| *B60W 10/06* | (2006.01) |
| *B60W 10/105* | (2012.01) |
| *B60W 10/08* | (2006.01) |
| *F16H 3/72* | (2006.01) |

(52) U.S. Cl.
CPC ...... *B60W 30/18136* (2013.01); *B60W 10/06* (2013.01); *B60W 10/08* (2013.01); *B60W 10/105* (2013.01); *B60W 30/18109* (2013.01); *B60W 2510/0638* (2013.01); *B60W 2520/10* (2013.01); *B60W 2520/105* (2013.01); *B60W 2540/12* (2013.01); *B60W 2710/0627* (2013.01); *B60W 2710/0633* (2013.01); *B60W 2710/0644* (2013.01); *B60W 2710/083* (2013.01); *B60W 2710/1005* (2013.01); *F16H 3/725* (2013.01)

(58) Field of Classification Search
CPC ... B60K 6/543; B60W 30/18136; F16H 61/21
See application file for complete search history.

(56) References Cited

U.S. PATENT DOCUMENTS

| | | | | |
|---|---|---|---|---|
| 4,696,380 A | * | 9/1987 | Kita | B60W 10/101 192/221 |
| 5,730,680 A | * | 3/1998 | Toukura | F16H 61/66254 477/45 |
| 5,806,642 A | * | 9/1998 | Harada | F16H 61/0021 192/218 |
| 7,072,754 B1 | | 7/2006 | Sherrod | |
| 7,559,387 B2 | | 7/2009 | Tamai | |
| 2006/0068971 A1 | * | 3/2006 | Kobayashi | B60H 1/00314 477/37 |

FOREIGN PATENT DOCUMENTS

EP          0180916 A1     5/1986

* cited by examiner

*Primary Examiner* — Tisha D Lewis
(74) *Attorney, Agent, or Firm* — David Kelley; McCoy Russell LLP

(57) ABSTRACT

Systems and methods for operating a vehicle that includes a continuously variable transmission are described. The systems and methods adjust engine speed according to one of a plurality of engine speed to vehicle speed profiles so that driveline noise, vibration, and harshness may be reduced. The different engine speed to vehicle speed profiles provide different levels of engine braking.

19 Claims, 7 Drawing Sheets

METHODS AND SYSTEM FOR CONTROLLING ENGINE BRAKING

FIELD

The present description relates to methods and a system for operating a powertrain of a vehicle that includes a continuously variable transmission (CVT). The methods and systems may be particularly useful for operating a vehicle on roads that have negative grades.

BACKGROUND AND SUMMARY

A vehicle may include a CVT to improve vehicle fuel economy and reduce vehicle weight. In some examples, the CVT may couple an engine to wheels via a belt or chain, and the belt or chain is positioned between a variable driving pulley and a variable driven pulley. A radius of the variable driving pulley (e.g., a pulley in the CVT closest to the engine along a torque path in the driveline arrangement) may be increased or decreased to change the CVT input to output ratio. Likewise, a radius of the variable driven pulley (e.g., a pulley in the CVT farthest from the engine along the torque path in the driveline arrangement) may be increased or decreased to change the CVT input shaft turns to output shaft turns ratio (e.g., the CVT ratio). The belt or chain may transfer engine torque from the engine to vehicle wheels while a driver of the vehicle is requesting positive torque. On the other hand, if the driver is not requesting torque or very little torque and the vehicle is traveling on a road having a negative grade, the belt or chain may transfer a portion of the vehicle's kinetic energy to the engine. Engine friction and pumping work (e.g., compression and expansion of gases within the engine) may oppose torque transferred from the vehicle's wheels to the engine so that vehicle acceleration may be reduced.

In other examples, the CVT may take form a planetary gear set and a generator. Torque of the generator may be adjusted so that engine speed may be controlled independently of wheel speed. Engine torque and torque of a motor positioned downstream of the generator in a vehicle driveline may be used to propel the vehicle when driver demand is high. Conversely, at least a portion of the vehicle's kinetic energy may be transferred through the planetary gear set and to the engine via adjusting a torque of the generator when driver demand is low and engine braking is requested.

However, when a CVT is transferring torque from vehicle wheels to an engine to utilize engine braking, driveline noise and vibration may increase to undesirable levels because the CVT may be controlled to limit engine speed to less than a sole threshold speed. For example, the CVT may control engine speed to remain less than a maximum engine speed, and the driveline may make a considerable amount of noise when the engine is rotating near maximum engine speed. Thus, it may be desirable to provide a way of utilizing engine braking while limiting exposure of vehicle occupants to driveline noise and vibrations.

The inventors herein have recognized the above-mentioned issues and have developed a vehicle operating method, comprising: operating a continuously variable transmission (CVT) via a controller to adjust engine speed according to a first engine speed to vehicle speed profile in response to a request for engine braking; and changing operation of the CVT via the controller to adjust engine speed according to a second engine speed to vehicle speed profile in response to a vehicle speed error and brake pedal position.

By adjusting engine speed via a CVT according to one of a plurality of engine speed to vehicle speed profiles, it may be possible to provide a desired level of engine braking without producing more driveline noise and vibration than is desired. One or more of the plurality of engine speed to vehicle speed profiles may hold engine speed constant while vehicle speed increases after the vehicle has reached a threshold speed. In addition, speed of an engine may be constrained to less than a threshold engine speed for each engine speed to vehicle speed profile, and each engine speed to vehicle speed profile may have a different upper threshold or maximum engine speed than other engine speed to vehicle speed profiles. The different engine speed to vehicle speed profiles may have different upper engine speed thresholds so that engine noise may be adjusted to the severity of road grade. In this way, driveline noise may scale with grade in a way that provides an improved vehicle driving experience. Further, the conditions for changing between the different engine speeds to vehicle speed profiles may provide for improved vehicle drivability by limiting switching between the profiles.

The present description may provide several advantages. In particular, the approach may provide desirable levels of driveline noise and vibration during engine braking in a vehicle that includes a CVT. Further, the approach may provide conditions that are useful to limit driveline noise according to severity of road grade so that a driver experiences a driveline noise level that may be more commensurate with driving conditions. In addition, the approach may provide additional engine braking after an engine reaches a threshold speed so that vehicle speed may be controlled without having to switch to a different engine speed to vehicle speed control profile.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
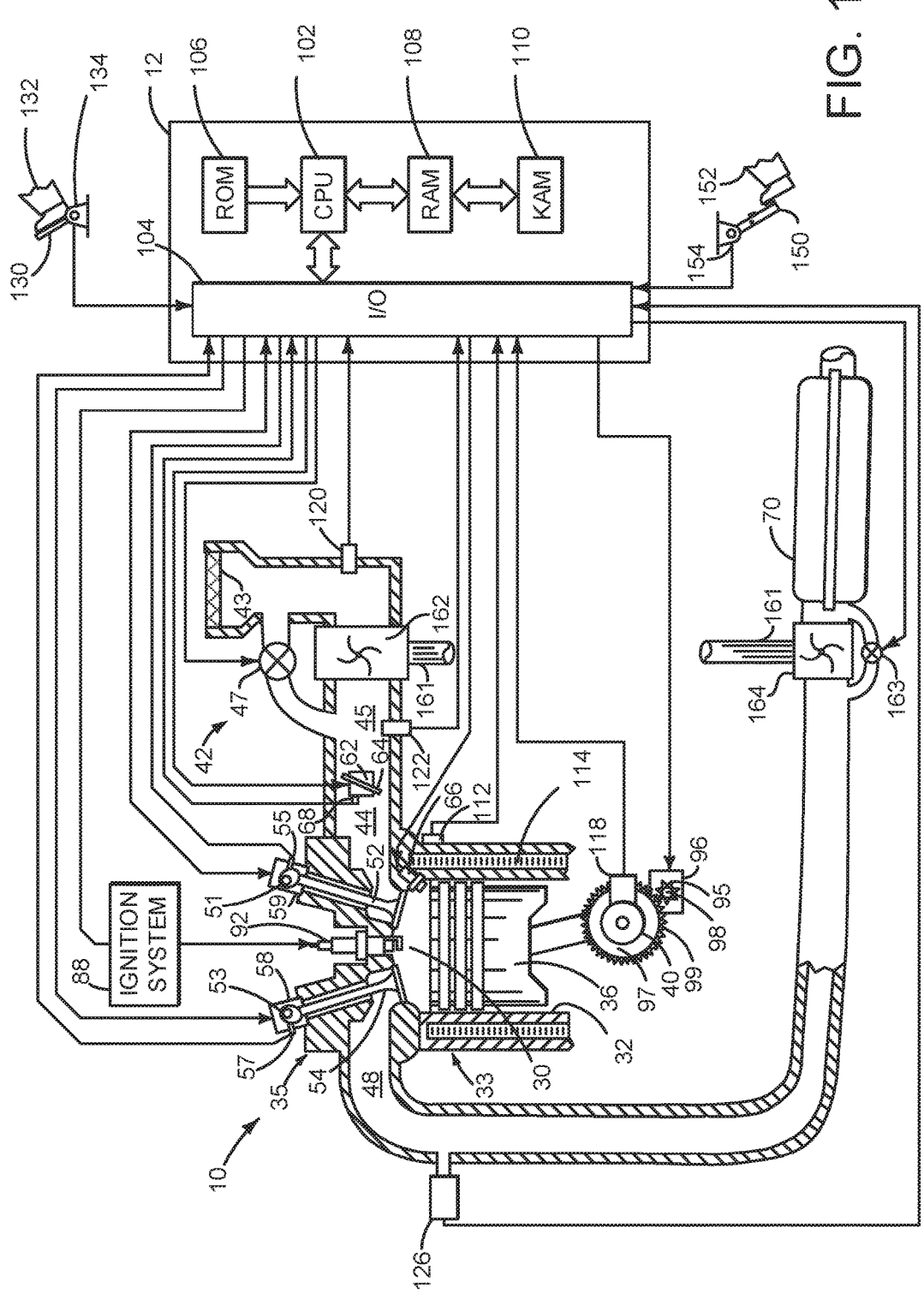
FIG. 1 is a schematic diagram of an engine.
Figure 2A:
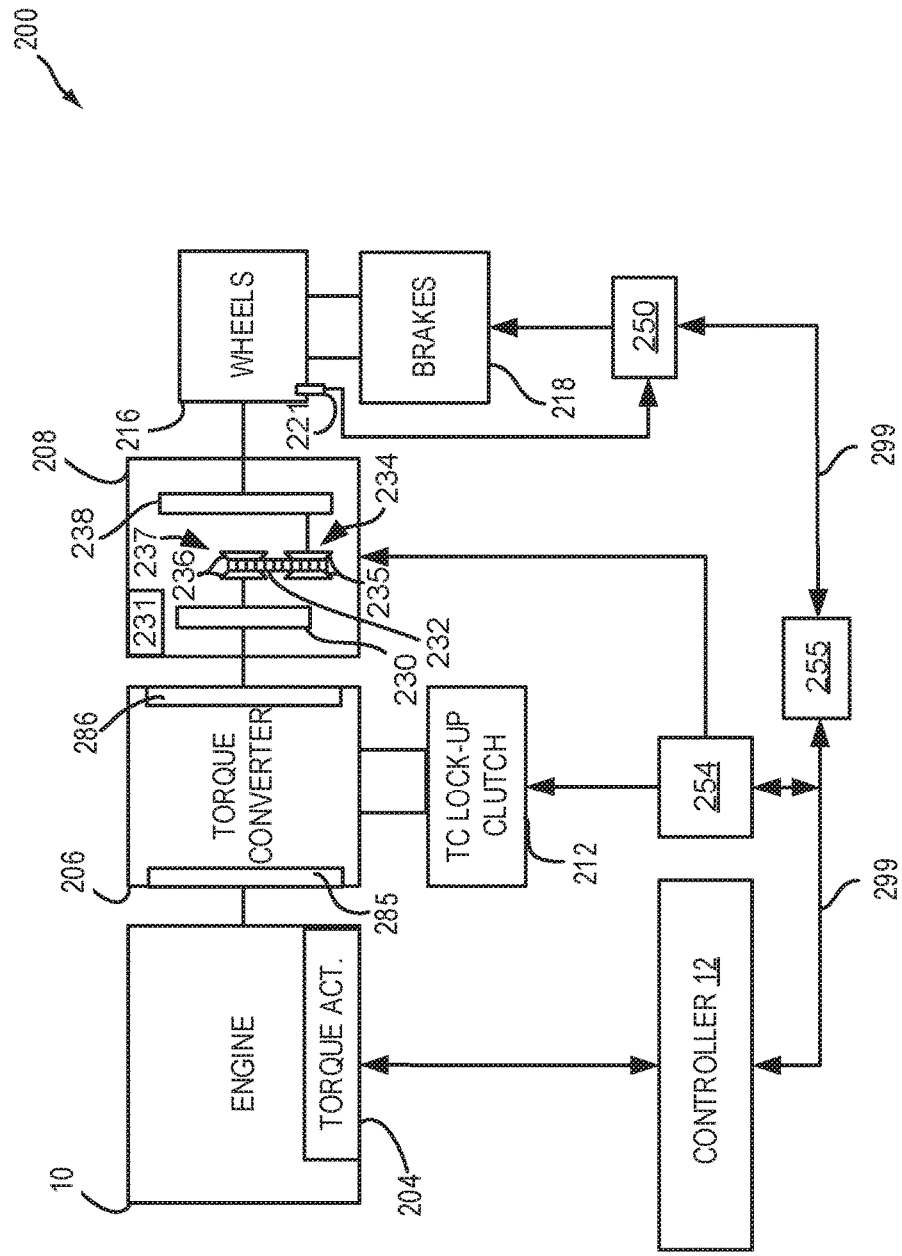
FIG. 2A is a schematic diagram of a first example vehicle driveline.
Figure 2B:
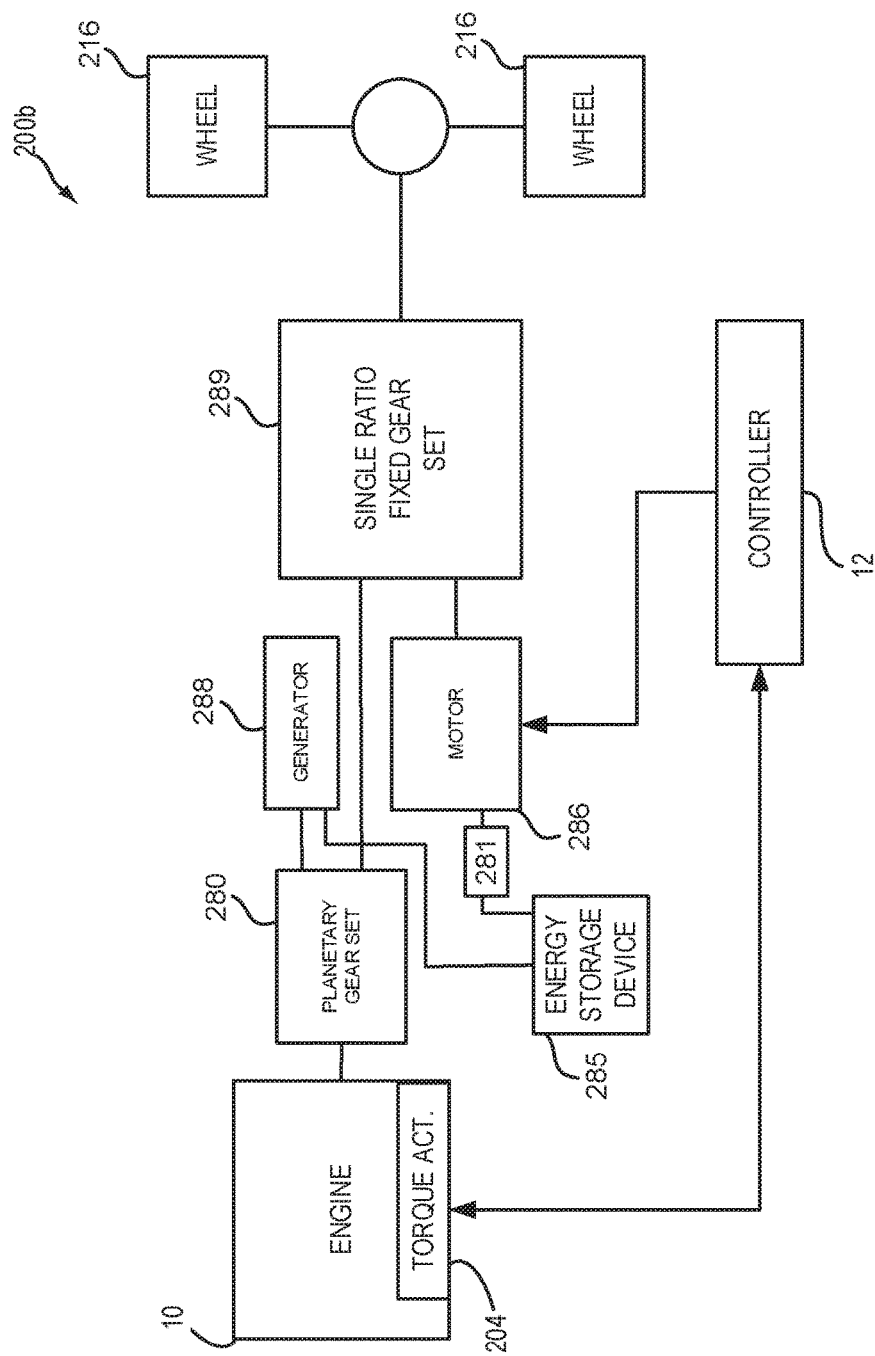
FIG. 2B is a schematic diagram of a second example vehicle driveline.
Figure 3:
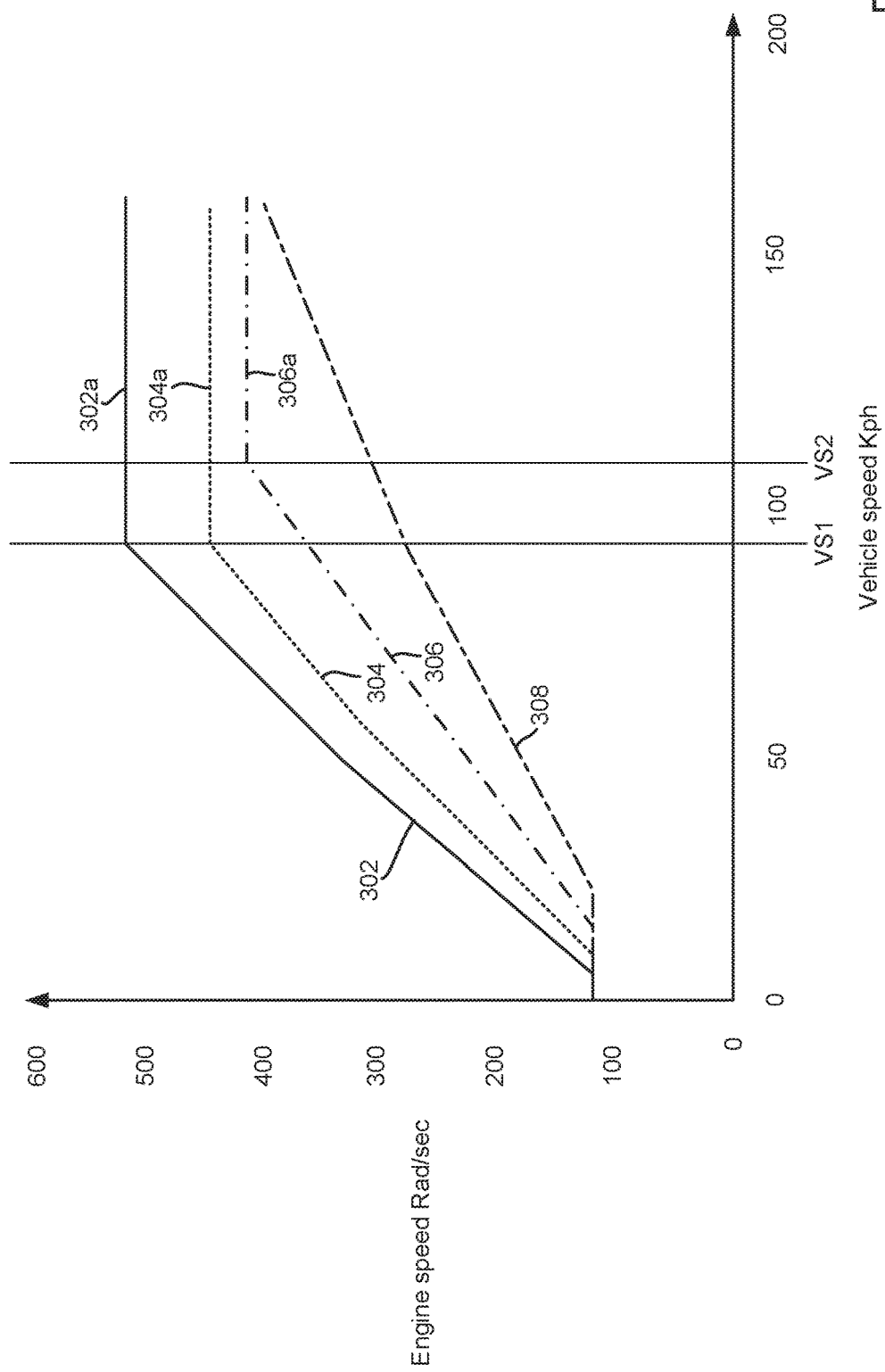
FIG. 3 shows example CVT engine speed to vehicle speed profiles that provide a basis for adjusting CVT input to output ratio.

The present description is related to operating a driveline of a vehicle. The driveline may include an engine, torque converter, and a CVT. The vehicle's engine may be configured as is shown in FIG. 1. The engine of FIG. 1 may be included in a driveline as is shown in FIGS. 2A and 2B. The CVT may be operated to provide engine speed to vehicle speed profiles as shown in FIG. 3. The systems of FIGS. 1, 2A, and 2B may provide the operating sequence of FIG. 4. The method of FIGS. 5A and 5B may be included in the system of FIGS. 1, 2A, and 2B to provide the operating sequence of FIG. 4.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which includes combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Opening and closing time of intake valve 52 may be moved relative to a position of crankshaft 40 via valve phase adjusting device 59. Similarly, opening and closing time of exhaust valve 54 may be moved relative to a position of crankshaft 40 via valve phase adjusting device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2A is a block diagram of a vehicle 225 including a powertrain or driveline 200. The powertrain of FIG. 2A includes engine 10 shown in FIG. 1. Powertrain 200 is shown including vehicle system controller 255, engine controller 12, CVT controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded CVT, information regarding a degraded engine, information regarding degraded brakes). Further, the vehicle system controller 255 may provide commands to engine controller 12, CVT controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250.

In other examples, the partitioning of controlling powertrain devices may be partitioned differently than is shown in FIG. 2A. For example, a single controller may take the place of vehicle system controller 255, engine controller 12, CVT controller 254, and brake controller 250. Alternatively, the vehicle system controller 255 and the engine controller 12 may be a single unit while the CVT controller 254, and the brake controller 250 are standalone controllers.

In this example, powertrain 200 may be powered by engine 10. Engine 10 may be started with an engine starting system shown in FIG. 1. An engine output torque may be transmitted to impeller 285 of torque converter 206. Torque converter output is transferred from turbine 286 to CVT 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to CVT 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to CVT 208. Alternatively, the torque converter lock-up clutch 212 may be partially engaged, thereby enabling the amount of torque directly relayed to the CVT to be adjusted. The CVT controller 254 may be configured to adjust the amount of torque transmitted by torque converter 212 by adjusting the torque converter lock-up clutch in response to various engine operating conditions, or based on a driver-based engine operation request.

CVT 208 may include drive-neutral-reverse gear set 230, input or driving pulley 237, output or driven pulley 234, and output gear set 238. Actuators 231 may expand or contract input pulley sheaves 236 and output pulley sheaves 235 to vary an actual total number of CVT input pulley turns to an actual total number of CVT output pulley turns (e.g., CVT ratio). Belt or chain 232 transfers torque between input pulley 237 and output pulley 234. By adjusting the CVT ratio, engine speed may be adjusted relative to vehicle speed so that the engine may be operated at efficient operating conditions. CVT controller 254 may command actuators 231 to adjust positions of sheaves 236 and sheaves 235. Output pulley 234 may transfer engine torque to vehicle wheel 216 via output gear set 238. CVT controller 254 may adjust positions of sheaves 236 and 235 responsive to engine load, engine speed, vehicle speed, CVT temperature, and other operating conditions.

A speed of wheels 216 may be determined via wheel speed sensor 221. Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then requests the engine torque from engine controller 12. CVT 254 selectively locks torque converter clutch 212 and adjusts a CVT ratio via input pulley sheaves 236 and output pulley sheaves 235.

In response to a request to decelerate vehicle 225 and provide engine braking, vehicle system controller may cease or reduce an amount of fuel injected to engine 10 and request an engine speed to vehicle speed as prescribed by one of a plurality of engine speed to vehicle speed profiles as shown in FIG. 3. Alternatively, CVT controller 254 may adjust the CVT ratio to provide an engine speed to vehicle speed as prescribed by one of the plurality of engine speed to vehicle speed profiles in response to an engine braking request from vehicle system controller 255. The engine braking request may be provided in response to brake pedal position. Vehicle system controller 255 may also request braking via friction brakes 218.

Referring now to FIG. 2B, an alternative driveline 200b is shown. Driveline 200b includes engine 10 and torque actuator 204 as described in FIGS. 1 and 2A. Engine 10 provides torque to planetary gear set 280 and generator 288 may operate in a speed control mode whereby torque of generator 288 is adjusted to control speed of engine 10 to a desired speed via planetary gear set 280. Engine torque output from planetary gear set 280 may be supplied to single ratio gearing system 289. Electrical output from generator 288 provides electrical energy to energy storage device 285 and motor 286. Electrical energy storage device 285 may supply electrical power to motor 286 via variable voltage controller 281 when engine 10 is not operating. Electrical energy storage device 285 may be a battery, capacitor, or other electrical energy storage device, and electrical energy storage device 285 may be selectively electrically coupled to stationary power grid (not shown). During some conditions, motor 286 may also be operated in a generator mode for regenerative braking. Torque from engine 10 and motor 286 may be combined in single ratio gearing system 289 to provide torque to vehicle wheels 216 via a mechanical power path. Controller 12 controls operation of engine 10, generator 288, and motor 286 to adjust power supplied to vehicle wheels 216. Thus, the driveline of FIG. 2B does not include a transmission with multiple fixed gear ratios for delivering engine and motor power to vehicle wheels.

Speed of engine 10 may be adjusted to a speed that is independent of a speed of motor 286 and wheels 216 such that driveline 200b operates as a CVT that is electrically controlled via adjusting a torque of generator 288. In particular, an actual total number of engine turns provided to the planetary gear set to an actual number of turns input to the single ratio gear set or vehicle wheels (e.g., CVT ratio) may be adjusted via adjusting torque of generator 288.

In one example, engine 10 is mechanically coupled to a planetary carrier of planetary gear set 280. Generator 288 is mechanically coupled to a sun gear of the planetary gear set 280, and a ring gear of the planetary gear set 280 is mechanically coupled to single ratio gear set 289. Motor 286 is also coupled to single ratio gear set 286. Planetary gear set 280 allows engine 10 to rotate at a speed that is different from wheel speed and motor speed. There does not have to be a fixed ratio speed difference between engine 10 and wheels 216 or motor 286. Rather, engine speed may be adjusted to a speed that is independent of wheel speed by adjusting a torque of generator 288. For example, engine speed may be varied with speed of wheels 216, engine speed may be varied while wheel speed is constant, or engine speed may be held constant while speed of wheels 216 varies.

Referring now to FIG. 3, an example plot of engine speed to vehicle speed profiles for operating a CVT to control engine braking is shown. Vertical lines at VS1 and VS2 represent vehicle speeds at which one or more of the engine speed to vehicle speed profiles provides constant engine speed as vehicle speed increases. The engine speed to vehicle speed profiles (e.g., engine braking profiles) shown in FIG. 3 may be stored in non-transitory memory of one or more controllers shown in the system of FIGS. 1, 2A, and 2B. Further, one or more of the engine speed to vehicle speed profiles shown in FIG. 3 may be the basis for operating a CVT as described in the method of FIGS. 5A and 5B.

The plot of FIG. 3 includes a vertical axis that represents engine speed and a horizontal axis that represents vehicle speed. Each of engine speed to vehicle speed profiles 302-308 provide a different level of engine braking. Profile 308 provides a lower level of engine braking as compared to profiles 306, 304, and 302. Profile 302 provides a highest level of engine braking. Profile 308 may provide a desired rate of vehicle deceleration when the vehicle is traveling on a road with a small negative grade (e.g., −0.5% grade). Profile 302 may provide the desired rate of vehicle decoration when the vehicle is traveling on a road having a larger negative grade (e.g., −2% negative grade).

It may be observed that profile 308 begins at a constant engine speed for lower vehicle speeds. Then, engine speed increases linearly as vehicle speed increases. Engine braking torque may increase as engine speed follows profile 308 since engine friction increases with engine speed. The engine may not receive fuel and the engine may be rotated via the vehicle's kinetic energy when the CVT is operated to provide engine speed to vehicle speed profile 308. The ratio of the CVT may be adjusted in response to vehicle speed so that engine speed follows the relationship with vehicle speed shown in profile 308.

Profile 306 provides a higher level of engine braking (e.g., more resistance to engine and vehicle motion) as compared to profile 308. The higher level of engine braking is due to the higher engine speeds relative to vehicle speeds as compared to profile 308. In addition, profile 306 provides constant engine speed for increasing vehicle speeds for vehicle speeds greater than VS2. Section 306a is a constant engine speed section of profile 306 that may be referred to as a not to exceed engine speed for profile 306. By holding engine speed constant for vehicle speeds greater than VS2, driveline noise and vibrations may be held to less than a threshold level when the absolute value of road grades is less than a threshold. Thus, for mild negative road grades, vehicle driveline noise and vibration may be constrained to less than a first threshold level. On the other hand, for steeper negative road grades, vehicle drive line noise and vibration may be allowed to increase to a second threshold level during more extreme driving condition where a human driver may be tolerant of increased vehicle noise levels. In some examples, engine pumping work may be increased when engine speed is maintained constant in profile section 306a while vehicle speed is increasing via adjusting engine valve timing. Increasing engine pumping work may further increase engine braking even when engine speed is maintained constant so that vehicle speed may be maintained or reduced at higher vehicle speeds. In some examples, engine pumping work may not be increased at vehicle speeds less than VS2 for profile 306.

Profile 304 provides an even higher level of engine braking as compared to profile 306. Profile 304 may be activated and the CVT may control engine speed according to profile 306 when the vehicle is descending steeper negative grades so that vehicle speed may be controlled with lower levels of wheel friction braking. Similar to profile 306, profile 304 provides a constant engine speed for vehicle speeds greater than VS1. The constant engine speed profile section 304a above vehicle speeds of VS1 is greater than the constant engine speeds for vehicle speeds greater than VS2 provided by profile 306. The greater constant engine speed for vehicle speeds greater than VS1 shown in profile 304, allows for higher levels of driveline noise and vibration so that higher levels of engine braking may be provided. Further, a human driver of the vehicle may accept higher levels of noise and vibration when engine braking is activated for steeper grades. Thus, the higher constant engine speed above vehicle speed VS1, may limit driveline noise and vibration while providing higher levels of engine braking. Section 304a is a constant engine speed section of profile 304 that may be referred to as a not to exceed engine speed for profile 304. In some examples, engine pumping work may not be increased at vehicle speeds less than VS1 for profile 304.

Profile 302 provides a highest level of engine braking in this example. For a given vehicle speed (e.g., VS1) is provides a highest engine speed, thereby providing a highest amount of engine braking at the given vehicle speed. Further, profile 302 provides a greatest constant engine speed for increasing vehicle speeds so that a high level of engine braking may be provided without excessive driveline noise and vibration. Section 302a is a constant engine speed section of profile 302 that may be referred to as a not to exceed engine speed for profile 302. In some examples, engine pumping work may not be increased at vehicle speeds less than VS1 for profile 302.

Depending on vehicle operating conditions, a vehicle may provide engine braking according to profile 308 and then increase engine braking according to profiles 306, 304, and 302. Further, vehicle braking may be provided at a higher level according to profile 302 and then be reduced according to profile 308. Engine speeds at vehicle speeds that do not conform to profiles 302 to 308 are avoided during engine braking.

It should be noted that although FIG. 3 shows four example engine speed to vehicle speed profiles. However, a fewer or greater number of engine speed to vehicle speed profiles may be provided. In addition, engine speed to vehicle speed profiles need not necessarily follow the shapes of profiles shown in FIG. 3. For example, engine speed to vehicle speed profiles may follow an exponential trajectory.

Figure 4:
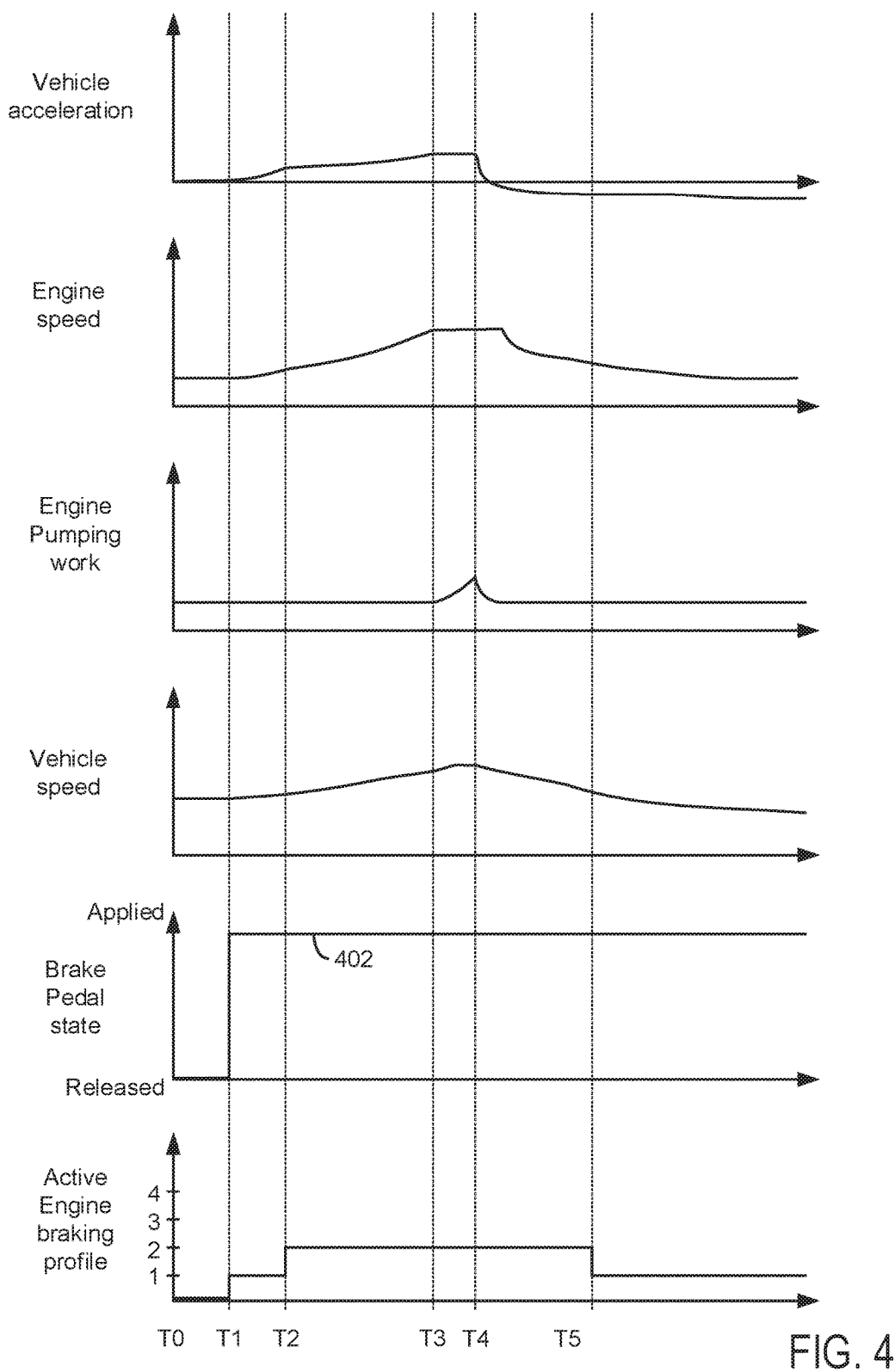
FIG. 4 shows a prophetic operating sequence according to the method of FIGS. 5A and 5B.
Figure 5A:
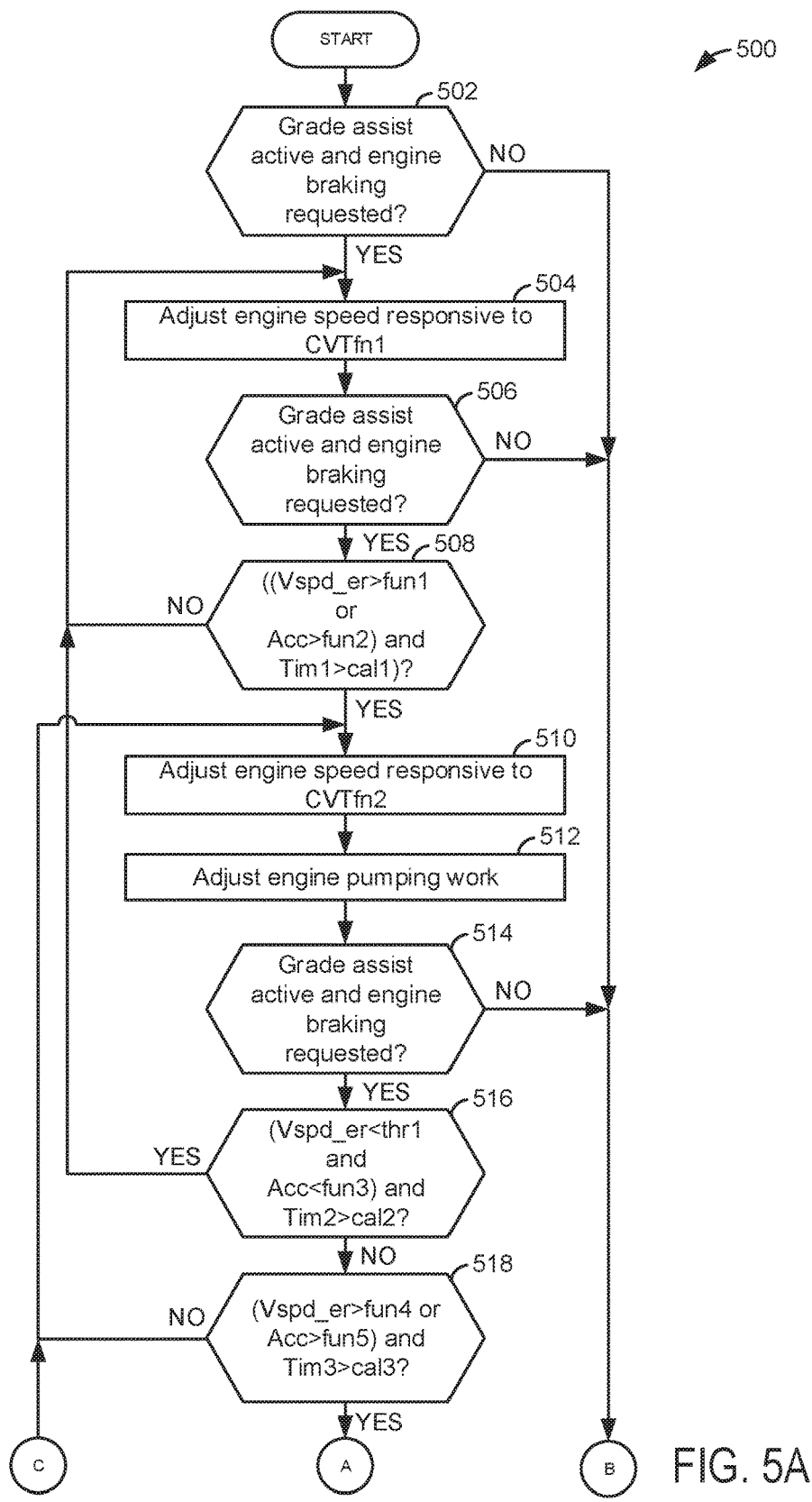
FIGS. 5A and 5B show an example method for operating a driveline of a vehicle.
Figure 5B:
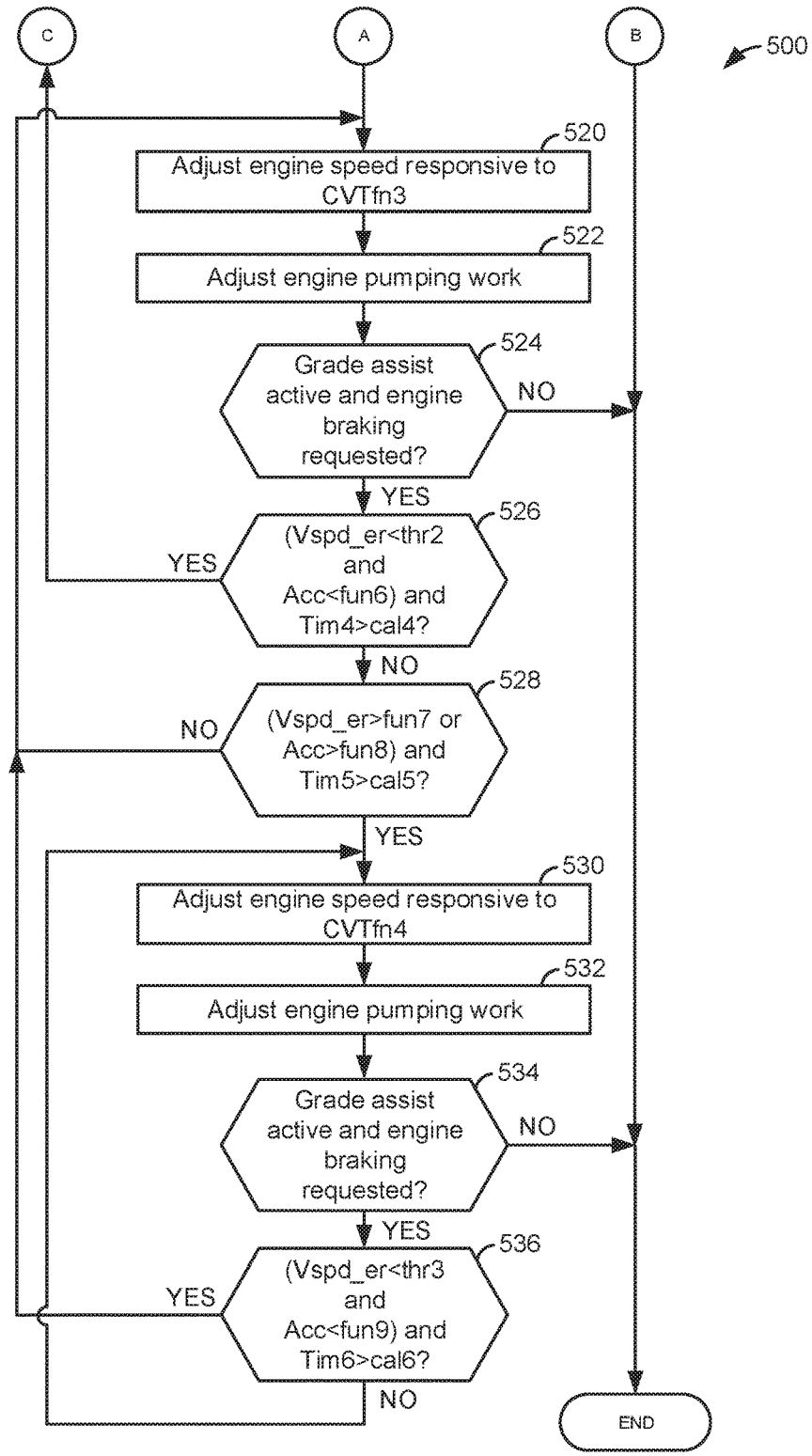

Referring now to FIG. 4, a prophetic operating sequence according to the method of FIGS. 5A and 5B is shown. The vehicle operating sequence shown in FIG. 4 may be provided via the method of FIGS. 5A and 5B in cooperation with the system shown in FIGS. 1, 2A, and 2B. The plots shown in FIG. 4 occur at the same time and are aligned in time.

The first plot from the top of FIG. 4 is a plot of vehicle acceleration versus time. The vertical axis represents vehicle acceleration and vehicle acceleration increases in the direction of the vertical axis arrow. The horizontal axis represents time and time increases from the left side of the figure to the right side of the figure.

The second plot from the top of FIG. 4 is a plot of engine speed versus time. The horizontal axis represents time and time increases from the left side of the figure to the right side of the figure. The vertical axis represents engine speed and engine speed increases in the direction of the vertical axis arrow.

The third plot from the top of FIG. 4 is a plot of engine pumping work versus time. The vertical axis represents engine pumping work and engine pumping work increases in the direction of the vertical axis arrow. The horizontal axis represents time and time increases from the left side of the figure to the right side of the figure.

The fourth plot from the top of FIG. 4 is a plot of vehicle speed versus time. The vertical axis represents vehicle speed and vehicle speed increases in the direction of the vertical axis arrow. The horizontal axis represents time and time increases from the left side of the figure to the right side of the figure.

The fifth plot from the top of FIG. 4 is a plot of vehicle brake pedal state versus time. The vertical axis represents vehicle brake pedal state and the brake pedal is applied when trace 402 is at a higher level near the vertical axis arrow. The vehicle brake pedal is not applied when trace 402 is at a lower level near the horizontal axis.

The sixth plot from the top of FIG. 4 is a plot of active engine braking profile versus time. The vertical axis represents which engine braking profile (e.g., profiles as shown in FIG. 3) is active and engine braking increases as the active engine braking profile number increases. For example, an engine braking profile having a value of one may represent engine braking profile 308 of FIG. 3. An engine braking profile having a value of four may represent engine braking profile 302 of FIG. 3. The horizontal axis represents time and time increases from the left side of the figure to the right side of the figure.

At time T0, the vehicle is not accelerating and engine speed is constant. The engine pumping work and vehicle speed are also constant. The brake pedal is not applied and no engine braking profile is active.

At time T1, the brake pedal is applied and vehicle acceleration is at a low level. Engine speed remains at its previous level and engine pumping work remains at its previous level. Vehicle speed is not increasing and the first engine braking profile is activated in response to the vehicle brakes being applied.

Between time T1 and time T2, the vehicle accelerates as the vehicle travels downhill (not shown). The engine speed increases as vehicle speed increases to increase engine braking. The engine pumping work remains constant and the vehicle speed increases. The brake pedal continues to be applied and the first engine braking profile remains active. The engine speed is adjusted responsive to vehicle speed via a CVT adjusting a ratio of the CVT.

At time T2, the vehicle reaches an acceleration level that causes the CVT to activate the second engine braking profile. The engine speed relative to the vehicle speed is adjusted via the CVT according to the second engine braking profile. The brake continues to be applied and the vehicle speed continues to increase. The engine speed also continues to increase and the engine pumping work remains constant.

Between time T2 and time T3, the vehicle continues to accelerate and engine speed continues to increase. The engine pumping work remains constant and vehicle speed continues to increase as the vehicle accelerates. The brake pedal continues to be applied and the second engine braking profile remains activated. These conditions may be indicative of the vehicle traveling on a road with a negative grade that becomes steeper.

At time T3, vehicle speed reaches a threshold speed where engine pumping work is increased. In one example, engine intake valve closing is advanced or retarded to near bottom dead center intake stroke and exhaust valve timing is advance so that exhaust valve opening moves toward top-dead-center expansion stroke. In this way, the amount of air entering engine cylinders and being compressed increases while exhaust valves are opened earlier to release air expanding in cylinders, thereby increasing engine pumping work. By increasing engine pumping work after engine speed reaches a threshold speed, engine braking may be increased without having to increase engine speed so that engine noise and/or vibration may be reduced.

Between time T3 and time T4, vehicle speed continues to increase while engine speed is held constant via the CVT. The CVT holds engine speed constant by varying the CVT ratio. The engine pumping work is increased with increasing vehicle speed. The vehicle continues to accelerate and the brake pedal remains applied. The second engine braking profile remains active.

At time T4, the vehicle begins to decelerate and engine speed remains at its previous constant value as vehicle speed decreases. The engine pumping work begins to be reduced and the brake pedal remains applied. The second engine braking profile remains active. Such conditions may be present when a vehicle decelerates in response to road grade.

Between time T4 and time T5, the vehicle continues to decelerate and the engine decelerates from the previous constant speed. The engine pumping work is reduced to a level it was prior to time T3. The vehicle brake remains applied.

At time T5, the active engine braking profile is changed from the second profile to the first profile in response to a vehicle speed error being less than a threshold. The vehicle continues to decelerate and engine speed continues to decrease. The engine pumping work remains constant and the brake pedal continues to be applied.

In this way, engine braking may be adjusted via adjusting a ratio of a CVT according to a plurality of profiles that relate engine speed to vehicle speed. Additionally, the engine pumping work may be increased and decreased to adjust engine braking during conditions where increasing engine speed may increase driveline noise and vibration above threshold levels.

Referring now to FIGS. 5A and 5B, an example flow chart for a method for operating a vehicle driveline is shown. The method of FIGS. 5A and 5B may be incorporated and may operate in cooperation with the systems of FIGS. 1, 2A, and 2B. Further, at least portions of the method of FIGS. 5A and 5B may be incorporated as executable instructions stored in non-transitory memory while other portions of the method may be performed via a controller transforming operating states of devices and actuators in the physical world. It should be noted that although FIGS. 5A and 5B illustrate a flowchart, a state machine may implement the method of FIGS. 5A and 5B without departing from the scope of the invention.

At 502, method 500 judges if grade assist and engine braking are requested. In one example, a human driver may select grade assist via a user interface for the purpose of slowing the vehicle using less wheel friction braking. Engine braking and grade assist may be activated or requested in response to a driver releasing an accelerator pedal or requesting less than a threshold amount of torque from the driveline. Vehicle speed at the time the accelerator pedal is released is used as a desired vehicle speed and grade assist attempts to keep vehicle speed at the desired vehicle speed. Initially, grade assist may first rely on regenerative braking to maintain vehicle speed, but grade assist may also add engine braking as describe herein when there is insufficient regenerative braking capacity to maintain a desired vehicle speed. Grade assist may be useful for extending live of wheel friction brakes and maintaining vehicle speed while traveling on a road having a negative grade.

If method 500 judges that grade assist is active and engine braking is requested, the answer is yes and method 500 proceeds to 504. Otherwise, the answer is no and method 500 proceeds to exit. If method 500 exits during vehicle deceleration conditions, the engine may be rotated without being fueled when vehicle brakes are applied. Alternatively, the engine speed may be reduced to an idle speed while the engine continues to rotate after exiting.

At 504, method 500 adjusts engine speed responsive to an engine braking profile CVTfn1 which relates engine speed to vehicle speed. Engine braking profile CVTfn1 may be as shown in engine braking profile 308 of FIG. 3, and the engine braking profile may provide a lower level of engine braking as compared to other engine braking profiles. The function CVTfn1 describes a relationship between engine speed and vehicle speed that provides a desired amount of engine braking. The CVT ratio is adjusted according to engine braking profile CVTfn1 to provide an engine speed at a particular vehicle speed. In addition, fuel flow to the engine may be deactivated during engine braking. Method 500 proceeds to 506.

At 506, method 500 again judges if grade assist and engine braking are requested. Method 500 judges if grade assist and engine braking are requested again in case it may be desirable to exit engine braking in response to a human driver applying an accelerator pedal or other condition that may be indicative of a desired to exit engine braking. If method 500 judges that grade assist and engine braking are not requested, the answer is no and method 500 exits. Otherwise, the answer is yes and method 500 proceeds to 508.

At 508, method 500 judges if vehicle speed error (Vspd_er) is greater than output of function (fun1) or if vehicle acceleration (Acc) is greater than output of function (fun2). If either condition is true and engine speed has been adjusted responsive to engine braking profile CVTfn1 for an amount of time (Tim1) greater than a threshold (cal1), then the answer is yes and method 500 proceeds to 510. Otherwise, the answer is no and method 500 returns to 504. The conditions at 508 may be mathematically expressed as: If ((Vspd_er>fun1 or Acc>fun2) and Tim1>cal1), then method 500 proceeds to 510. Otherwise, method 500 returns to 504. In one example, function fun1 is a table stored in non-transitory memory that is referenced via present vehicle speed error (desired vehicle speed minus actual vehicle speed) and brake pedal position input. The fun1 table contains empirically determined vehicle speed error values against which vehicle speed error is compared. Function fun2 is a second table stored in non-transitory memory that is referenced via present vehicle acceleration and brake pedal position. The fun2 table contains empirically determined vehicle acceleration values against which vehicle acceleration is compared. In one example, values of fun1 are provided such that method 500 requires a smaller vehicle speed error to move to 510 as a brake pedal position increases (e.g., for a higher braking torque command). Tim1 is a value of a timer that tracks an amount of time engine speed is adjusted responsive to CVTfn1 and cal1 is a predetermined threshold amount of time.

At 510, method 500 adjusts engine speed responsive to an engine braking profile CVTfn2 which relates engine speed to vehicle speed. Engine braking profile CVTfn2 may be as shown in engine braking profile 306 of FIG. 3, and the engine braking profile may provide a next higher level of engine braking as compared to the engine braking profile CVTfn1. The function CVTfn2 describes a relationship between engine speed and vehicle speed that provides a desired amount of engine braking. The CVT ratio is adjusted according to engine braking profile CVTfn2 to provide an engine speed at a particular vehicle speed. For example, as shown in FIG. 3, if vehicle speed is greater than VS2 and the engine braking profile 306 is activated, the CVT ratio is adjusted to provide an engine speed equal to engine speed in line segment 306a. In addition, fuel flow to the engine may be deactivated during engine braking. Method 500 proceeds to 512.

At 512, method 500 may adjust engine pumping work as a function of engine speed and vehicle speed. In particular, if engine speed is in a region where engine speed is held constant as vehicle speed increases (e.g., segment 306a in FIG. 3), engine pumping work may be increased as vehicle speed increases via adjusting intake and exhaust valve timing. For example, intake valve closing timing may be adjusted (e.g., advanced or retarded) to increase cylinder air charge while at the same time exhaust valve opening timing may be advanced to release compressed gas sooner to increase engine pumping work as vehicle speed increases while engine speed is held constant. Likewise, intake valve closing timing may be adjusted (e.g., advanced or retarded) to decrease cylinder air charge while at the same time exhaust valve opening timing may be retarded to hold compressed gas longer to decrease engine pumping work as vehicle speed decreases while engine speed is held constant. In this way, engine pumping work may be adjusted responsive to vehicle speed while engine speed is held constant so that suitable levels of engine braking may be provided even when an engine braking profile is limiting engine speed to reduce driveline noise and vibration. Method 500 proceeds to 514.

At 514, method 500 again judges if grade assist and engine braking are requested. Method 500 judges if grade assist and engine braking are requested again in case it may be desirable to exit engine braking in response to a human driver applying an accelerator pedal or other condition that may be indicative of a desired to exit engine braking. If method 500 judges that grade assist and engine braking are not requested, the answer is no and method 500 exits. Otherwise, the answer is yes and method 500 proceeds to 516.

At 516, method 500 judges if vehicle speed error (Vspd_er) is less than a predetermined threshold (thr1) and if vehicle acceleration (Acc) is less than output of function (fun3). If both conditions are true and engine speed has been adjusted responsive to engine braking profile CVTfn2 for an amount of time (Tim2) greater than a threshold (cal2), then the answer is yes and method 500 returns to 504. Otherwise, the answer is no and method 500 proceeds to 518. The conditions at 516 may be mathematically expressed as: if ((Vspd_er<thr1 and Acc>fun3) and Tim2>cal2), then method 500 returns to 504. Otherwise, method 500 proceeds to 518. In one example, thr1 is a predetermined threshold variable stored in non-transitory memory. Function fun3 is a table stored in non-transitory memory that is referenced via present vehicle acceleration and brake pedal position. The fun3 table contains empirically determined vehicle acceleration values against which present vehicle acceleration is compared. Tim2 is a value of a timer that tracks an amount of time engine speed is adjusted responsive to CVTfn2 and cal2 is a predetermined threshold amount of time.

At 518, method 500 judges if vehicle speed error (Vspd_er) is greater than output of function (fun4) or if vehicle acceleration (Acc) is greater than output of function (fun5). If either condition is true and engine speed has been adjusted responsive to engine braking profile CVTfn2 for an amount of time (Tim3) greater than a threshold (cal3), then the answer is yes and method 500 proceeds to 520. Otherwise, the answer is no and method 500 returns to 510. The conditions at 518 may be mathematically expressed as: if ((Vspd_er>fun4 or Acc>fun5) and Tim3>cal3), then method 500 proceeds to 520. Otherwise, method 500 returns to 510. In one example, function fun4 is a table stored in non-transitory memory that is referenced via present vehicle speed error (desired vehicle speed minus actual vehicle speed) and brake pedal position input. The fun4 table contains empirically determined vehicle speed error values against which present vehicle speed error is compared. In one example, values of fun4 are provided such that method 500 requires a smaller vehicle speed error to move to 520 as a brake pedal position increases (e.g., for a higher braking torque command). Function fun5 is a second table stored in non-transitory memory that is referenced via present vehicle acceleration and brake pedal position. The fun5 table contains empirically determined vehicle acceleration values against which vehicle acceleration is compared. Tim3 is a value of a timer that tracks an amount of time engine speed is adjusted responsive to CVTfn2 and cal3 is a predetermined threshold amount of time.

At 520, method 500 adjusts engine speed responsive to an engine braking profile CVTfn3 which relates engine speed to vehicle speed. Engine braking profile CVTfn3 may be as shown in engine braking profile 304 of FIG. 3, and the engine braking profile may provide a next higher level of engine braking as compared to the engine braking profile CVTfn2. The function CVTfn3 describes a relationship between engine speed and vehicle speed that provides a desired amount of engine braking. The CVT ratio is adjusted according to engine braking profile CVTfn3 to provide an engine speed at a particular vehicle speed. In addition, fuel flow to the engine may be deactivated during engine braking. Method 500 proceeds to 522.

At 522, method 500 may adjust engine pumping work as a function of engine speed and vehicle speed. In particular, if engine speed is in a region where engine speed is held constant as vehicle speed increases (e.g., engine speed greater than VS1 in FIG. 3), engine pumping work may be increased as vehicle speed increases via adjusting intake and exhaust valve timing. Likewise, intake valve closing timing may be adjusted (e.g., advanced or retarded) to decrease cylinder air charge while at the same time exhaust valve opening timing may be retarded to hold compressed gas longer to decrease engine pumping work as vehicle speed decreases while engine speed is held constant. In this way, engine pumping work may be adjusted responsive to vehicle speed while engine speed is held constant so that suitable levels of engine braking may be provided even when an engine braking profile is limiting engine speed to reduce driveline noise and vibration. Method 500 proceeds to 524.

At 524, method 500 again judges if grade assist and engine braking are requested. Method 500 judges if grade assist and engine braking are requested again in case it may be desirable to exit engine braking in response to a human driver applying an accelerator pedal or other condition that may be indicative of a desired to exit engine braking. If method 500 judges that grade assist and engine braking are not requested, the answer is no and method 500 exits. Otherwise, the answer is yes and method 500 proceeds to 526.

At 526, method 500 judges if vehicle speed error (Vspd_er) is less than a predetermined threshold (thr2) and if vehicle acceleration (Acc) is less than output of function (fun6). If both conditions are true and engine speed has been adjusted responsive to engine braking profile CVTfn3 for an amount of time (Tim4) greater than a threshold (cal4), then the answer is yes and method 500 returns to 510. Otherwise, the answer is no and method 500 proceeds to 528. The conditions at 526 may be mathematically expressed as: if ((Vspd_er<thr2 and Acc>fun6) and Tim4>cal4), then method 500 returns to 510. Otherwise, method 500 proceeds to 528. In one example, thr2 is a predetermined threshold variable stored in non-transitory memory. Function fun6 is a table stored in non-transitory memory that is referenced via present vehicle acceleration and brake pedal position. The fun6 table contains empirically determined vehicle acceleration values against which present vehicle acceleration is compared. Tim4 is a value of a timer that tracks an amount of time engine speed is adjusted responsive to CVTfn3 and cal4 is a predetermined threshold amount of time.

At 528, method 500 judges if vehicle speed error (Vspd_er) is greater than output of function (fun7) or if vehicle acceleration (Acc) is greater than output of function (fun8). If either condition is true and engine speed has been adjusted responsive to engine braking profile CVTfn3 for an amount of time (Tim5) greater than a threshold (cal5), then the answer is yes and method 500 proceeds to 530. Otherwise, the answer is no and method 500 returns to 520. The conditions at 528 may be mathematically expressed as: if ((Vspd_er>fun7 or Acc>fun8) and Tim5>cal5), then method 500 proceeds to 530. Otherwise, method 500 returns to 520. In one example, function fun7 is a table stored in non-transitory memory that is referenced via present vehicle speed error (desired vehicle speed minus actual vehicle speed) and brake pedal position input. The fun7 table contains empirically determined vehicle speed error values against which present vehicle speed error is compared. In one example, values of fun7 are provided such that method 500 requires a smaller vehicle speed error to move to 530 as a brake pedal position increases (e.g., for a higher braking torque command). Function fun8 is a second table stored in non-transitory memory that is referenced via present vehicle acceleration and brake pedal position. The fun8 table contains empirically determined vehicle acceleration values against which vehicle acceleration is compared. Tim5 is a value of a timer that tracks an amount of time engine speed is adjusted responsive to CVTfn3 and cal5 is a predetermined threshold amount of time.

At 530, method 500 adjusts engine speed responsive to an engine braking profile CVTfn4 which relates engine speed to vehicle speed. Engine braking profile CVTfn4 may be as shown in engine braking profile 302 of FIG. 3, and the engine braking profile may provide a next higher level of engine braking as compared to the engine braking profile CVTfn3. The function CVTfn4 describes a relationship between engine speed and vehicle speed that provides a desired amount of engine braking. The CVT ratio is adjusted according to engine braking profile CVTfn4 to provide an engine speed at a particular vehicle speed. In addition, fuel flow to the engine may be deactivated during engine braking. Method 500 proceeds to 532.

At 532, method 500 may adjust engine pumping work as a function of engine speed and vehicle speed. In particular, if engine speed is in a region where engine speed is held constant as vehicle speed increases (e.g., engine speed greater than VS1 in FIG. 3), engine pumping work may be increased as vehicle speed increases via adjusting intake and exhaust valve timing. Likewise, intake valve closing timing may be adjusted (e.g., advanced or retarded) to decrease cylinder air charge while at the same time exhaust valve opening timing may be retarded to hold compressed gas longer to decrease engine pumping work as vehicle speed decreases while engine speed is held constant. In this way, engine pumping work may be adjusted responsive to vehicle speed while engine speed is held constant so that suitable levels of engine braking may be provided even when an engine braking profile is limiting engine speed to reduce driveline noise and vibration. Method 500 proceeds to 534.

At 534, method 500 again judges if grade assist and engine braking are requested. Method 500 judges if grade assist and engine braking are requested again in case it may be desirable to exit engine braking in response to a human driver applying an accelerator pedal or other condition that may be indicative of a desired to exit engine braking. If method 500 judges that grade assist and engine braking are not requested, the answer is no and method 500 exits. Otherwise, the answer is yes and method 500 proceeds to 536.

At 536, method 500 judges if vehicle speed error (Vspd_er) is less than a predetermined threshold (thr3) and if vehicle acceleration (Acc) is less than output of function (fun9). If both conditions are true and engine speed has been adjusted responsive to engine braking profile CVTfn4 for an amount of time (Tim6) greater than a threshold (cal6), then the answer is yes and method 500 returns to 520. Otherwise, the answer is no and method 500 returns to 530. The conditions at 536 may be mathematically expressed as: if ((Vspd_er<thr3 and Acc>fun9) and Tim6>cal6), then method 500 returns to 520. Otherwise, method 500 returns to 530. In one example, thr3 is a predetermined threshold variable stored in non-transitory memory. Function fun9 is a table stored in non-transitory memory that is referenced via present vehicle acceleration and brake pedal position.

The fun9 table contains empirically determined vehicle acceleration values against which present vehicle acceleration is compared. Tim6 is a value of a timer that tracks an amount of time engine speed is adjusted responsive to CVTfn4 and cal6 is a predetermined threshold amount of time.

Method 500 may begin fueling the engine and operating the engine without engine braking when method 500 exits. Thus, the engine may begin to propel the vehicle again after method 500 exits.

Thus, the method of FIGS. 5A and 5B provides for a vehicle operating method, comprising: operating a continuously variable transmission (CVT) via a controller to adjust engine speed according to a first engine speed to vehicle speed profile in response to a request for engine braking; and changing operation of the CVT via the controller to adjust engine speed according to a second engine speed to vehicle speed profile in response to a vehicle speed error and brake pedal position. The method includes where the first engine speed to vehicle speed profile is a linear relationship between engine speed and vehicle speed. The method includes where the second engine speed to vehicle speed profile includes a first threshold engine speed not to be exceeded. The method further comprises changing operation of the CVT via the controller to adjust engine speed according to a third engine speed to vehicle speed profile in response to a vehicle speed error and brake pedal position. The method includes where the third engine speed to vehicle speed profile includes a second threshold engine speed not to be exceeded, the second threshold speed greater than the first threshold engine speed. The method further comprises providing engine braking while the CVT adjusts engine speed according to the second engine speed to vehicle speed profile.

The method of FIGS. 5A and 5B also provides for a vehicle operating method, comprising: operating a continuously variable transmission (CVT) via a controller to adjust engine speed according to a first engine speed to vehicle speed profile in response to a request for engine braking; and changing operation of the CVT via the controller to adjust engine speed according to a second engine speed to vehicle speed profile in response to a vehicle acceleration and brake pedal position. The method further comprises increasing engine pumping work in response to increasing vehicle speed while vehicle speed is greater than a threshold speed and while the CVT is adjusting engine speed according to the second engine speed to vehicle speed profile. The method further comprises decreasing engine pumping work in response to decreasing vehicle speed while vehicle speed is greater than a threshold speed and while the CVT is adjusting engine speed according to the second engine speed to vehicle speed profile.

In some examples, the method includes where first engine speed to vehicle speed profile provides a lower engine speed for a vehicle speed than the second engine speed to vehicle speed profile provides for the vehicle speed. The method includes where the second engine speed to vehicle speed profile provides a greater amount of engine braking for a vehicle speed than the first engine speed to vehicle speed profile provides for the vehicle speed. The method includes where the CVT is a belt or chain driven CVT and further comprises requiring a threshold amount of time to adjust engine speed according to the first engine speed to vehicle speed profile before adjusting engine speed according to the second engine speed to vehicle speed profile. The method includes where the CVT includes a planetary gear set and a generator and further comprises changing operation of the CVT via the controller to adjust engine speed according to the first engine speed to vehicle speed profile after adjusting engine speed according to the second engine speed to vehicle speed profile in response to a vehicle acceleration and brake pedal position. The method further comprises changing operation of the CVT via the controller to adjust engine speed according to a third engine speed to vehicle speed profile after adjusting engine speed according to the second engine speed to vehicle speed profile in response to a vehicle acceleration and brake pedal position.

The method of FIGS. 5A and 5B provides for a vehicle operating method, comprising: operating a continuously variable transmission (CVT) via a controller to adjust engine speed according to a first engine speed to vehicle speed profile in response to a request for engine braking; changing operation of the CVT via the controller to adjust engine speed according to a second engine speed to vehicle speed profile in response to a vehicle speed error and brake pedal position; and increasing engine pumping work in response to vehicle speed being greater than a threshold speed while the CVT is adjusting engine speed according to the second engine speed to vehicle speed profile. The method includes where the engine pumping work is increased via adjusting intake valve timing and exhaust valve timing of an engine. The method includes where the CVT is coupled to an engine. The method includes where the CVT adjusts engine speed via adjusting an input to output ratio of the CVT. The method includes not increasing engine pumping work while vehicle speed is less than the threshold speed while the CVT is adjusting engine speed according to the second engine speed to vehicle speed profile. The method further comprises ceasing fuel flow to an engine while adjusting engine speed according to the second engine speed to vehicle speed profile.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
   operating a continuously variable transmission (CVT) via a controller to adjust engine speed according to a first engine speed to vehicle speed profile in response to a request for engine braking; and
   changing operation of the CVT via the controller to adjust engine speed according to a second engine speed to vehicle speed profile in response to a vehicle speed error and brake pedal position.

2. The method of claim 1, where operating the CVT includes adjusting torque of an electric machine to adjust the engine speed.

3. The method of claim 2, where the second engine speed to vehicle speed profile includes a first threshold engine speed not to be exceeded.

4. The method of claim 3, further comprising changing operation of the CVT via the controller to adjust engine speed according to a third engine speed to vehicle speed profile in response to a vehicle speed error and brake pedal position.

5. The method of claim 4, where the third engine speed to vehicle speed profile includes a second threshold engine speed not to be exceeded, the second threshold speed greater than the first threshold engine speed.

6. The method of claim 1, further comprising providing engine braking while the CVT adjusts engine speed according to the second engine speed to vehicle speed profile.

7. A vehicle operating method, comprising:
   operating a continuously variable transmission (CVT) via a controller to adjust engine speed according to a first engine speed to vehicle speed profile in response to a request for engine braking;
   changing operation of the CVT via the controller to adjust engine speed according to a second engine speed to vehicle speed profile in response to a vehicle acceleration and brake pedal position; and
   increasing engine pumping work in response to increasing vehicle speed while vehicle speed is greater than a threshold speed and while the CVT is adjusting engine speed according to the second engine speed to vehicle speed profile.

8. The method of claim 7, further comprising decreasing engine pumping work in response to decreasing vehicle speed while vehicle speed is greater than the threshold speed and while the CVT is adjusting engine speed according to the second engine speed to vehicle speed profile.

9. A vehicle operating method, comprising:
   operating a continuously variable transmission (CVT) via a controller to adjust engine speed according to a first engine speed to vehicle speed profile in response to a request for engine braking; and
   changing operation of the CVT via the controller to adjust engine speed according to a second engine speed to vehicle speed profile in response to a vehicle acceleration and brake pedal position, where the first engine speed to vehicle speed profile provides a lower engine speed for a vehicle speed than the second engine speed to vehicle speed profile provides for the vehicle speed.

10. The method of claim 9, where the second engine speed to vehicle speed profile provides a greater amount of engine braking for the vehicle speed than the first engine speed to vehicle speed profile provides for the vehicle speed.

11. The method of claim 7, where the CVT is a belt or chain driven CVT, and further comprising:
requiring a threshold amount of time to adjust engine speed according to the first engine speed to vehicle speed profile before adjusting engine speed according to the second engine speed to vehicle speed profile.

12. The method of claim 7, where the CVT includes a planetary gear set and a generator, and further comprising:
changing operation of the CVT via the controller to adjust engine speed according to the first engine speed to vehicle speed profile after adjusting engine speed according to the second engine speed to vehicle speed profile in response to the vehicle acceleration and brake pedal position.

13. The method of claim 7, further comprising changing operation of the CVT via the controller to adjust engine speed according to a third engine speed to vehicle speed profile after adjusting engine speed according to the second engine speed to vehicle speed profile in response to the vehicle acceleration and brake pedal position.

14. A vehicle operating method, comprising:
operating a continuously variable transmission (CVT) via a controller to adjust engine speed according to a first engine speed to vehicle speed profile in response to a request for engine braking;
changing operation of the CVT via the controller to adjust engine speed according to a second engine speed to vehicle speed profile in response to a vehicle speed error and brake pedal position; and
increasing engine pumping work in response to vehicle speed being greater than a threshold speed while the CVT is adjusting engine speed according to the second engine speed to vehicle speed profile.

15. The method of claim 14, where the engine pumping work is increased via adjusting intake valve timing and exhaust valve timing of an engine.

16. The method of claim 14, where the CVT is coupled to an engine.

17. The method of claim 14, where the CVT adjusts engine speed via adjusting an input to output ratio of the CVT.

18. The method of claim 14, not increasing engine pumping work while vehicle speed is less than the threshold speed while the CVT is adjusting engine speed according to the second engine speed to vehicle speed profile.

19. The method of claim 14, further comprising ceasing fuel flow to an engine while adjusting engine speed according to the second engine speed to vehicle speed profile.

* * * * *